June 23, 1936.    C. J. W. CLASEN    2,044,971
RAILWAY CAR TRUCK
Filed Nov. 21, 1933
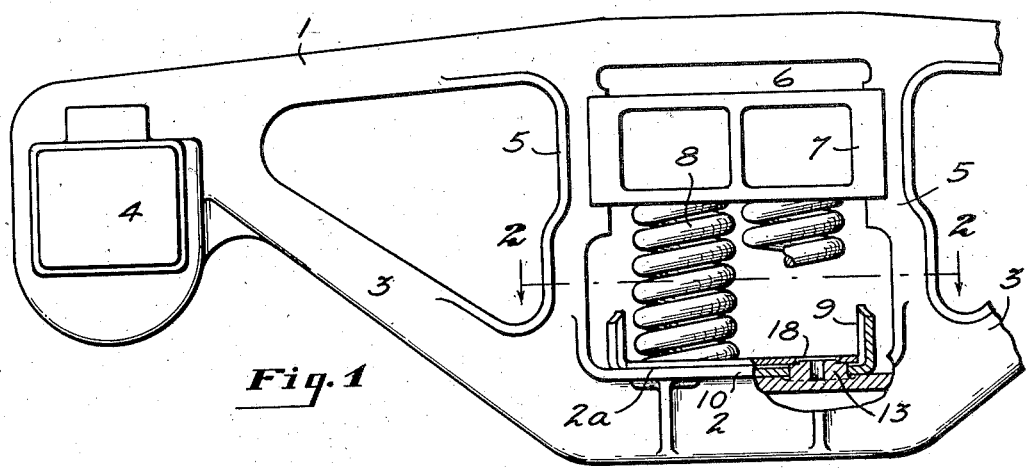
Fig. 1
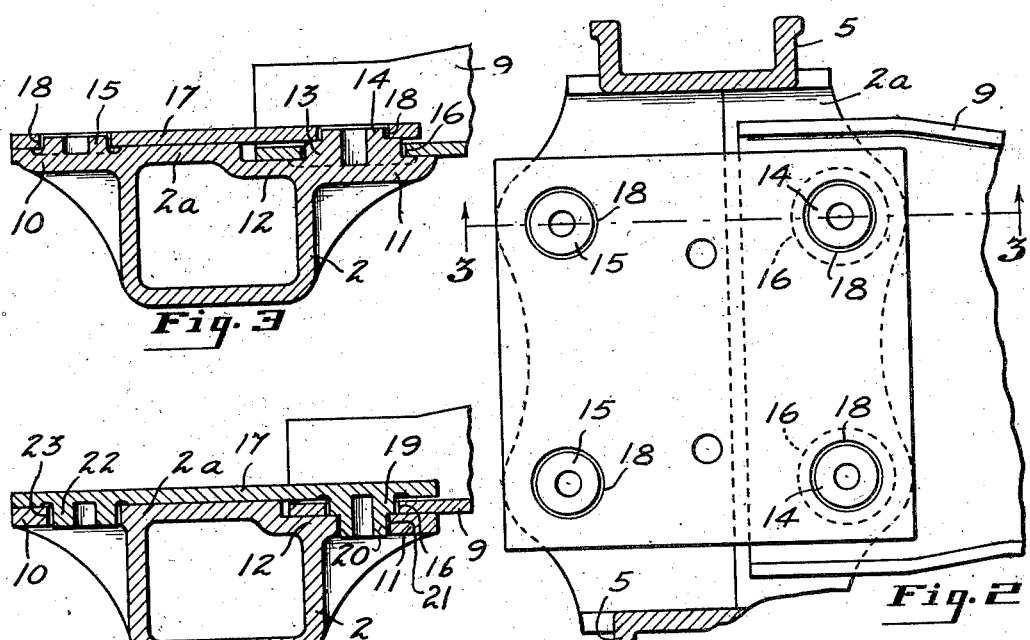
Fig. 3
Fig. 4
Fig. 2
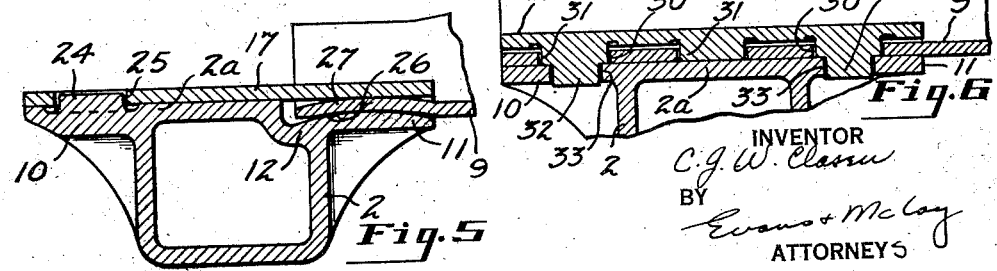
Fig. 5
Fig. 6
INVENTOR
C. J. W. Clasen
BY
Evans + McCoy
ATTORNEYS Patented June 23, 1936

2,044,971

UNITED STATES PATENT OFFICE 2,044,971

RAILWAY CAR TRUCK

Claus J. Werner Clasen, Davenport, Iowa, assignor to The Bettendorf Company, Bettendorf, Iowa, a corporation of Iowa Application November 21, 1933, Serial No. 699,007

14 Claims. (Cl. 105—208)

This invention relates to railway car trucks and more particularly to improved means for mounting the truck spring plank on the truck side frames.

Railway car trucks heretofore employed have been so constructed that when negotiating a curved track in which the outer rail is usually elevated to compensate for centrifugal forces or when passing over uneven track which raises or lowers one end of the truck axle relative to its other end, thus disposing such axle out of a horizontal plane, that the side frames may still remain vertical; or if due to horizontal forces acting on the side frame through the truck bolster such forces may act to produce a slight pendulum action of the side frame. In such constructions, however, which employ conventional spring plank mountings no provision has been made for transverse tilting or relative movement of the side frame relative to the spring plank, and breakage of the spring plank frequently occurs with the result that the brake beam safety supports which are usually connected with the spring plank are rendered inoperative and with the further result that the truck is frequently derailed.

One of the objects of the present invention is to provide a railway car truck with a new and improved means for mounting and supporting the spring plank on the truck side frames, which means is of such construction as to tend toward the elimination of spring plank breakage.

Another object is to provide a railway car truck having side frames with a spring plank so connected with and supported on the side frames that the side frames may have a tilting movement relative to the spring plank in order to eliminate bending stresses and strains heretofore occasioned by the operation of the truck over curved and irregular tracks.

A further object is to provide a side frame and spring plank mounting of such construction that the spring plank may have movement relative to the side frames without distortion of the spring plank while the side frames are in motion which render them out of perpendicular with the axles.

With the above and other objects in view, the invention may be said to comprise the structure hereinafter described and particularly set forth in the appended claims, together with such variations and modifications thereof as will be apparent to one skilled in the art to which this invention appertains.

In the drawing, which illustrates several embodiments of the present invention:

Figure 1 is a fragmentary side elevation of a truck side frame showing a spring plank mounted thereon, a portion of the side frame and spring plank being shown in section;

Fig. 2 is an enlarged transverse section taken approximately on the line 2—2 of Fig. 1, the bolster supporting springs being removed.

Fig. 3 is a section taken approximately on the line 3—3 of Fig. 2 showing the improved mounting of the spring plank on the truck side frame;

Fig. 4 is a section similar to Fig. 3 showing a modified form of the spring plank mounting;

Fig. 5 is a section similar to Fig. 3 showing a further modified form of the spring plank mounting; and Fig. 6 is a fragmentary section showing a further modified form of spring plank mounting.

Referring to the accompanying drawing in which like numerals refer to like parts throughout the several views, and in which only one of the side frames of a railway car truck is shown, the side frame comprises a compression member 1, a spring supporting portion 2 disposed below the compression member 1, and having a spring seat 2a, inclined tension members 3 extending from the spring supporting portion 2 and joining with the ends of the compression member 1 at the journal boxes 4, and spaced bolster columns 5 extending between the spring supporting portion 2 and the compression member 1 to provide an opening 6 for the reception of the bolster 7. The bolster 7 in the construction shown, is guided by the columns 5 and is supported on springs 8 which may be of the coil or elliptic type, or both, the springs being seated on a spring bearing plate 17. A spring plank 9 of suitable construction is also seated on the spring seats 2a of the spring supporting portion 2 to extend between the two side frames comprising the car truck.

In constructions heretofore employed, it is conventional practice to provide the journal boxes with crowned wedges to permit a tilting movement of the truck axles relative to the side frames, which, of course, will have the tendency to cause the side frames to have a substantial relative movement. However, in such constructions no provision is made in the spring plank mountings to allow for movement of the side frames relative to the spring plank during relative movement of the side frames.

Furthermore, side thrusts of the bolster frequently cause a lateral movement of the side frames which movement has a tendency to impose severe bending stresses on the spring plank with the result that in many cases breakage of the spring plank occurs.

The connections between the spring plank and side frames of the present invention are so arranged that the tilting and lateral movements of the side frames are permitted without imposing objectionable stresses on the spring plank.

In the construction shown in Figs. 1, 2 and 3, the spring supporting portion 2 of the side frame, as in conventional constructions, is provided with outer and inner side extensions or flanges 10 and 11, respectively. The inner flange 11, however, is disposed in a plane below the flange 10 and below the plane of the face of the spring seat 2a. A portion 12 of the spring seat 2a is also preferably downwardly offset as shown in Fig. 2 to lie in the plane of the flange 11.

The flange 11 illustrated in Fig. 3 is formed with spaced bosses 13 having portions 14 of reduced area disposed above the plane of the spring seat 2a and the flange 10 is also provided with spaced bosses 15 extending above the plane of the spring seat 2a to substantially the same height as the portions 14 of the bosses 13.

The end of the spring plank 9 which extends into the bolster opening 6 is provided with spaced recesses or apertures 16 of slightly larger area than the bosses 13 and the end of the spring plank 9 seats on the flange 11 and offset portion 12 with the bosses 13 projecting through the apertures 16 of the spring plank. The thickness of the spring plank is somewhat less than the distance between the planes of the offset portion 12 and spring seat 2a so that there is a slight clearance between the upper face of the spring plank and the plane of the spring seat 2a when the spring plank is in assembled position.

The springs 8, as before mentioned, are seated on the spring bearing plate 17 which is provided with apertures 18 corresponding to and preferably of slightly greater area than the bosses 15 and portions 14 of the bosses 13. This spring bearing plate 17 seats on the flange 10, the spring seat 2a and upon the shoulder portions of the bosses 13 provided by the portions 14 of reduced areas. With the plate 17 in this position, the bosses 15 and portions 14 project into the apertures 18 of the plate 17 to locate the plate 17.

It will be noted that the spring plank 9 has a slight clearance with respect to the plate 17 and that the bosses 13 have a clearance with respect to the openings 16 in the spring plank. These clearances will thus permit the side frame to tilt relative to the spring plank without imposing bending stresses on the spring plank.

In Fig. 4 a similar construction is illustrated with the exception that the boss portions formed on the flanges 10 and 11 in Fig. 3 are provided on the spring bearing plate 17. In this construction the bosses 19 which project through the apertures 16 of the spring plank 9 are formed on the spring plate 17 and seat upon the flange 11, the bosses 19 having locating portions 20 of reduced area which extend into apertures 21 provided in the flange 11. Other spaced bosses 22 are provided on the spring bearing plate to extend into enlarged apertures 23 provided in the flange 10.

In the modification shown in Fig. 5 the flange 10 is formed with bosses 24 which project into enlarged apertures 25 provided in the spring bearing plate 17. The flange 11 and the offset portion 12, however, are formed with a convex surface 26 extending longitudinally of the spring supporting portion 2, and the end of the spring plank 9 is also provided with a concave portion 27 which seats on the surface 26 at the one side and engages with the lower face of the spring bearing plate 17 at the other side. Locating means or bosses may be used in conjunction with the concave and convex portions if desired.

In the modified construction illustrated in Fig. 6 the flanges 10 and 11 of the spring supporting portion 2 are disposed in the same plane and the spring seat 2a is not offset as in the constructions previously described. In this construction the spring plank 9 preferably extends completely across the spring seat 2a and is provided with a plurality of apertures 30. The spring bearing plate 17 is provided with bosses 31, of lesser area than the apertures 30, which seat upon the spring seat 2a, and at least some of these bosses are provided with portions 32 of reduced size which extend through openings 33 formed in the flanges 10 and 11. It will be noted that in this construction the spring bearing plate 17 is supported by the bosses 31 above the web of the spring plank 9 so that the side frame may have a tilting movement relative to the spring plank 9. However, the bosses 31, if desired, may be formed on the spring seat 2a, and the portions 32 thereof may project through apertures in the spring bearing plate 17, so that the bosses 31 will support the spring bearing plate above the spring plank 9.

In each of the constructions described, provision is made for the side frame to have movement relative to the spring plank 9 so that in the event a transverse tilting or a rotative movement of the side frame in its plane does occur, such movement will not impose bending stresses upon the spring plank.

Although several embodiments of the invention have been herein shown and described it will be understood that numerous details of the construction shown may be altered or omitted without departing from the spirit of this invention as defined in the following claims.

What I claim is:

1. In a railway car truck, a side frame having a spring seat, a spring bearing plate carried by said spring seat, said bearing plate and spring seat having opposed spaced surfaces, and a spring plank having an end disposed between said spaced surfaces, said end having at least the greater portion of its upper surface spaced from said surface of said spring seat to permit limited free tilting movement of said spring plank relative to said side frame without interference from and without tendency to raise said bearing plate.

2. In a railway car truck, a side frame having a spring seat, a spring plank having an end supported on said seat, and a spring bearing plate also supported on said spring seat, said bearing plate being disposed above and having a clearance with respect to said spring plank to permit a limited free relative tilting movement between said spring plank and side frame.

3. In a railway car truck, a side frame having a spring seat, a spring plank having an end supported on said seat, and a spring bearing plate also supported on said spring seat, said bearing plate and spring seat having interfitting portions, and said bearing plate being disposed above said spring plank end in spaced relation to permit a limited free relative tilting movement between said spring plank and side frame.

4. In a railway car truck, a side frame having a spring seat, a spring plank having an end supported on said seat for relative tiltable movement between said spring plank and side frame, and a spring bearing plate also supported on said spring seat, said bearing plate and spring seat having interfitting portions, said spring plank having openings therethrough through which certain of said portions extend with clearance to permit said relative movement between said spring plank and side frame.

5. In a railway car truck, a side frame having a spring seat, a spring plank having one or more openings in its end portion, and a spring bearing plate having one or more projections extending within said spring plank openings and being supported on said spring seat and providing a space between said spring plank and the body portion of said spring bearing plate to loosely receive said spring plank and permit a limited free relative tilting movement between said spring plank and side frame.

6. In a railway car truck, a spring plank having one or more openings in its end portions, a side frame having a spring seat provided with projections extending upwardly through said spring plank openings, and a spring bearing plate supported upon said projections above said spring plank with clearance to permit a limited free relative tilting movement between said spring plank and said side frame.

7. In a railway car truck, a side frame having a spring seat, spring plank having an end seated on said spring seat, said end having one or more openings therethrough, and a spring bearing plate seated on said spring seat and having a portion spaced above said end of said spring plank, said bearing plate having one or more boss portions extending within said spring plank openings in spaced relation to permit relative tilting movement between said spring plank and side frame, said spring seat having one or more apertures therein and said boss portions having ends of reduced area projecting into said apertures.

8. In a railway car truck, a side frame having a spring seat, spring plank having one end seated on said spring seat, said end having one or more openings therethrough, and a spring bearing plate seated on said spring seat and having a portion spaced above said end of said spring plank, said spring seat having one or more upwardly extending boss portions extending within said spring plank openings in spaced relation to permit relative tilting movement between said spring plank and side frame, said bearing plate having one or more apertures therein and said boss portions having ends of reduced area projecting into said apertures.

9. In a railway car truck, a side frame having a spring seat provided with a longitudinally extending convex surface, a spring plank having an end provided with a transversely extending concave portion seating on said convex surface to permit relative tilting movement between said side frame and said spring plank, and a spring bearing plate also seated on said spring seat, said bearing plate being freely disposed above said spring plank to permit said relative movement between said side frame and spring plank.

10. In a railway car truck, a side frame having a spring seat, a side portion of said seat being offset to lie in a plane below the remainder thereof, a spring plank having an end seated on said offset portion and provided with an opening, and a spring bearing plate seated on said spring seat and extending over said spring plank end in spaced relation, said offset portion having a boss extending within said opening of said spring plank in spaced relation to permit relative tilting movement between said spring plank and side frame.

11. In a railway car truck, a side frame having a spring seat, a side portion of said seat being offset to lie in a plane below the remainder thereof, a spring plank having an end seated on said offset portion and provided with an opening, and a spring bearing plate seated on said spring seat and extending over said spring plank end in spaced relation, said bearing plate having a boss extending within said opening in spaced relation to permit relative tilting movement between said spring plank and side frame.

12. In a railway car truck, a side frame having a spring seat, a side portion of said seat being offset to lie in a plane below the remainder thereof, a spring plank having an end seated on said offset portion and provided with an opening, and a spring bearing plate seated on said spring seat and extending over said spring plank end in spaced relation, said offset portion having a boss extending within said opening of said spring plank in spaced relation to permit relative tilting movement between said spring plank and side frame, said bearing plate having an aperture therein and said boss having a shoulder engaging said plate and a reduced portion extending into said aperture.

13. In a railway car truck, a side frame having a spring seat, a side portion of said seat being offset to lie in a plane below the remainder thereof, a spring plank having an end seated on said offset portion and provided with an opening, and a spring bearing plate seated on said spring seat and extending over said spring plank end in spaced relation, said bearing plate having a boss extending within said opening in spaced relation to permit relative tilting movement between said spring plank and side frame, said offset portion having an aperture therein and said boss having a shoulder engaging said offset portion and having a reduced portion extending into said aperture.

14. In a railway car truck, a side frame having a spring seat provided with a longitudinally extending convex surface, a spring plank having an end provided with a transversely extending concave portion on its under surface and a transversely extending convex portion on its upper surface overlying said concave portion, said concave portion being seated on said convex surface of said spring seat, and a spring bearing plate also seated on said spring seat and having a portion freely overlying said convex portion of said spring plank, whereby to permit relative tilting movement between said side frame and spring plank.

CLAUS J. WERNER CLASEN.